United States Patent [19]

Mastak

[11] Patent Number: 4,667,808

[45] Date of Patent: May 26, 1987

[54] LOADING APPARATUS PARTICULARLY USEFUL FOR THE LOADING OR UNSTABLE CONTAINERS

[75] Inventor: Edmond J. Mastak, Tavares, Fla.

[73] Assignee: Simplimatic Engineering Co., Lynchburg, Va.

[21] Appl. No.: 745,716

[22] Filed: Jun. 17, 1985

[51] Int. Cl.$^4$ ............................................. B65G 47/26
[52] U.S. Cl. .................... 198/419; 198/429; 414/59; 414/68
[58] Field of Search ............ 198/425, 429, 347, 419, 198/420; 414/59, 68; 221/253, 22 A, 279; 53/448, 447, 154, 534–537, 543

[56] References Cited

U.S. PATENT DOCUMENTS

| | | | |
|---|---|---|---|
| 1,654,706 | 1/1928 | Schoen | 198/429 X |
| 2,765,599 | 10/1956 | Johnson | 53/448 |
| 3,172,547 | 3/1965 | Holstebroe | 414/59 |
| 3,570,685 | 3/1971 | Carlson | 414/59 |
| 3,659,726 | 5/1972 | Anderson | 414/59 |
| 3,682,290 | 8/1972 | Von Gal, Jr. et al. | 198/429 X |
| 3,788,497 | 1/1974 | Carlson | 198/419 X |
| 3,937,336 | 2/1976 | Carlson | 414/59 X |
| 4,227,845 | 10/1980 | Colby et al. | 414/39 |
| 4,269,299 | 5/1981 | Goodman | 198/347 |
| 4,328,886 | 5/1982 | Seragnoli | 198/347 |
| 4,502,587 | 3/1985 | Clark | 198/347 |

Primary Examiner—Joseph E. Valenza
Attorney, Agent, or Firm—James & Franklin

[57] ABSTRACT

Apparatus for loading rows of containers onto a loading station in which the containers are pushed onto the loading station in rows, preferably with the containers in adjacent rows being staggered relative to one another, the leading container row engages a wall which substantially uniformly frictionally resists the movement of rows onto the loading station, and in which side walls which supportingly engage the containers at the ends of the rows are moved with the rows as the loading station is filled.

7 Claims, 11 Drawing Figures

LOADING APPARATUS PARTICULARLY USEFUL FOR THE LOADING OR UNSTABLE CONTAINERS

This invention relates to packing apparatus for assembling a plurality of containers at a loading station, which apparatus is particularly effective in supporting unstable containers as they are moved onto the loading station and maintaining them erect and in proper position. It is particularly adapted for use in conjunction with a palletizer, and is here specifically disclosed in that connection, but in its broader aspect it is not limited thereto.

In the packaging and transportation of individual containers (cans, jars, bottles, etc.) it is common to arrange a group of such containers on a loading station, the group of containers thereafter as a unit being manipulated in some fashion. Typically, and as here specifically disclosed, the container group is loaded onto a tray and a plurality of such groups are stacked one on the other and are then secured together in that stacked condition to form a pallet. In a typical plant the containers to be thus manipulated are provided in very large numbers and the equipment which handles those containers, such as a palletizer, must be capable of handling those very large numbers of containers very rapidly and without malfunction. By malfunction is meant not only faulty operation of the palletizer or other packing equipment but also manipulation of the individual containers in such a way that the containers do not assume their proper positions on the loading station. If a container should be mispositioned, and particularly if a container should fall over, manual interposition on the part of the operator is required, and that usually involves stopping the equipment until the malfunction has been cured (the container has been properly positioned or stood properly on end). At best this involves a production loss of appreciable time duration, and at worst, if the operator's attention strays, serious jams and damaged containers can result.

When containers of conventional type, such as individual soft drink cans only a few inches high and with a round cross-section, are involved the problems associated with mispositioned or falling cans are not too great and hence conventional loading equipment can be used therewith. However, the use of containers that are more unstable is becoming much more prevalent. One such container is flask-like in shape, relatively tall and thin with a narrow elongated cross-section. Containers of this shape, because their cross-section is narrow and elongated and because their center of gravity is high, will, if tilted somewhat, tend to fall over rather than to resume a proper upright position. When attempts are made to use conventional high speed tray packing equipment with containers of this type the frequency of malfunctions of the bottle-falling-over type is so great that such conventional equipment cannot be used effectively, and as a result much slower operating equipment has had to be employed, and even then constant manual attention to the operation of the equipment has been required.

The lack of available high speed packing equipment which can be used with such unstable containers has greatly restricted the degree to which such containers have been adopted in industry, despite the fact that they are believed to be highly advantageous, because of their pleasing esthetic appearance, in persuading impulse purchasers to pick them from supermarket shelves or otherwise select them for purchase.

The most effective method of packaging a plurality of containers for shipment is to assemble the containers in rows at a loading station. The containers are first formed in rows and then the rows of containers are pushed, sometimes one at a time and sometimes a plurality of rows simultaneously, onto the loading station. The loading station will accommodate many more rows of containers than are pushed onto it in a single operation, and hence the loading of the loading station takes place in a plurality of row-moving operations until the total desired number of rows of containers are on the loading station. That group of container rows is then appropriately manipulated. In a palletizer that involves moving that group of rows down to make room for a new group of rows to be loaded on top of the first group.

When the rows of containers are moved onto the loading station and then moved along the loading station as new rows of containers are provided, that movement, and particularly the start and stop operations involved, tends to cause the containers to wobble, and this, particularly in the case of unstable containers, tends to cause the containers to fall and thus produce a malfunction. One attempt to minimize that type of malfunction, particularly when the containers are non-rectangular in cross-section, is to position each row of containers in a staggered relation relative to the adjacent rows, with the wider central portions of the containers of each row fitting into the spaces left by the narrower ends of the containers of adjacent rows, the containers thus mating and providing some degree of mutual support. That expedient has not, in itself, solved the problem. However, as will be seen, the present invention, which does solve the problem, is particularly well adapted to utilize the mutual support provided by this staggered arrangement.

The loading machine of the present invention provides the necessary support to containers, and particularly unstable containers, as they are being loaded onto the loading station by two operations each of which is itself very efficacious and both of which together produce a highly unexpected degree of improvement in container support. First, as the leading row of containers is moved onto the loading station it engages a retaining wall and pushes that wall back against an essentially uniform resistance not great enough to prevent the movement of that leading row of containers but great enough to maintain subsequent container rows in firm and uniform engagement with the row in front of them, thereby to produce in the assemblage of rows an essentially solid mass of containers, so that there is no room for containers inside the assemblage to fall.

Side walls are provided at the loading station between which the container rows are received, those side walls supportingly engaging end containers on given rows. In accordance with the second aspect of the present invention those side walls are designed to move in the direction of movement of the container rows along the loading station and to thus move simultaneously with the movement of the container rows, as a result of which there is no relative motion between those walls and the end containers which engage them and hence there is no tendency for any frictional effects from such relative motion to cause an end container or any other container to tip or become mispositioned. In the form here specifically disclosed, the said walls are formed of flexible belts which are mechanically connected to the above-mentioned retaining wall for simultaneous movement therewith. Hence, as the charge of containers at the loading station grows, the containers are uniformly and effectively supported, there is little room for any container to fall, and there is little in the functioning of the machine which would tend to cause any container to fall.

The prime object of the present invention is to provide a loading apparatus which will operate at the high speeds of conventional loading apparatus but which will also provide support for the containers being loaded so as to greatly minimize any tendency of those containers to be mispositioned or fall over.

It is a further object of the present invention to provide a loading apparatus particularly useful for use with unstable containers.

Another object of the present invention is to devise such apparatus which is itself at least as reliable and foolproof as conventional apparatus.

It is yet another object of the present invention to devise such apparatus which may be constructed from readily available units and subassemblies so that it will be relatively inexpensive and easy to maintain and repair.

An additional object of the present invention is to provide an apparatus which positively and effectively produces an array of staggered rows of containers at a loading station.

To the accomplishment of the above, and to such other objects as may hereinafter appear, the present invention relates to the structure of a machine for loading a group of containers in rows as defined in the appended claims and as described in this specification, taken together with the accompanying drawings, in which:

Figure 1:
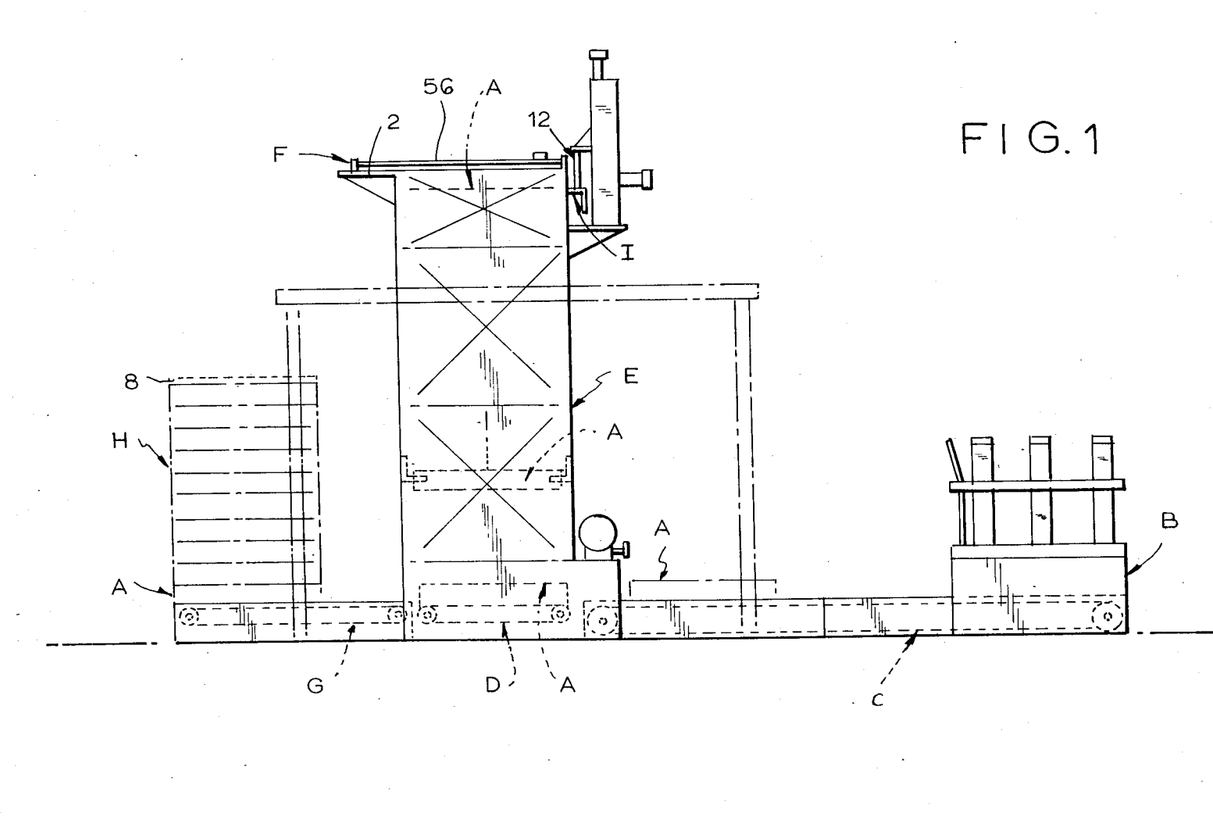
FIG. 1 is a schematic side elevational view of a palletizer in which the loading apparatus of the present invention is included.
Figure 2:
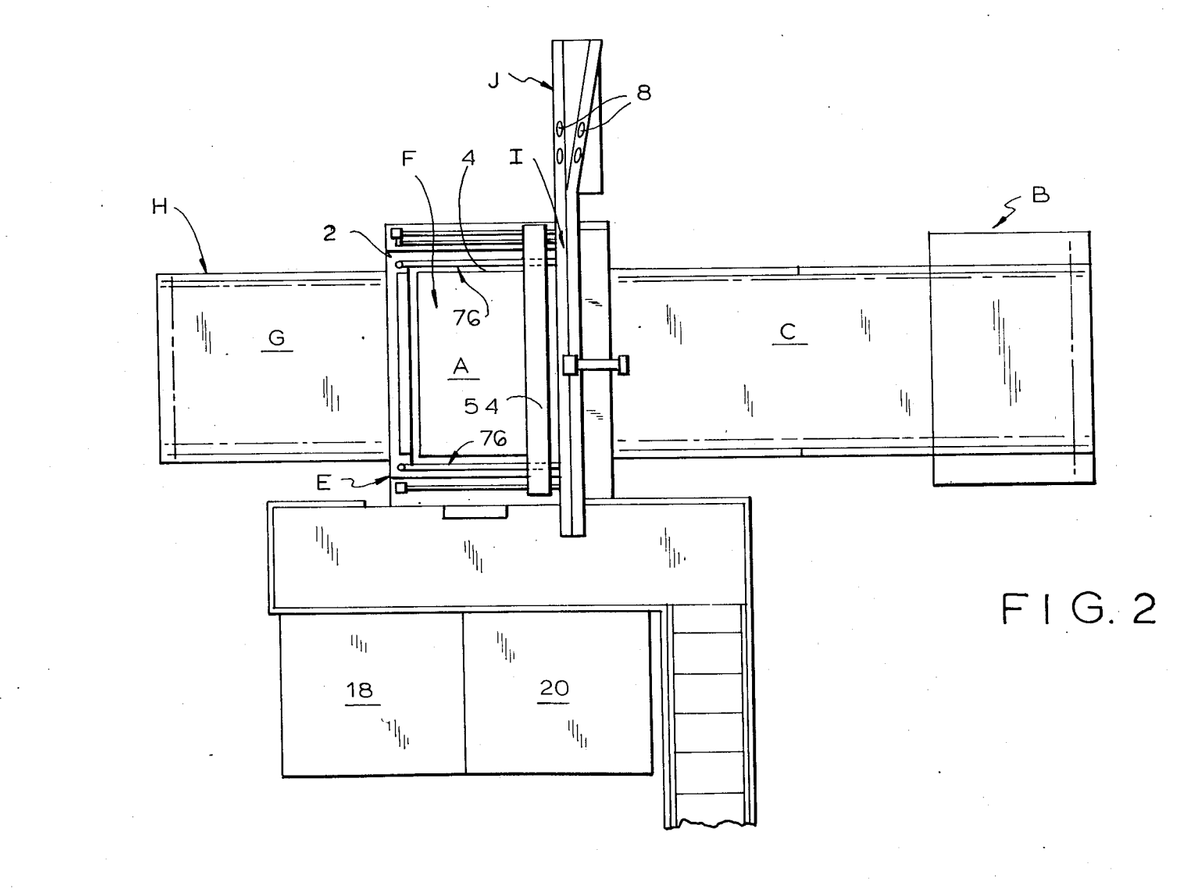
FIG. 2 is a top plan schematic view of the palletizer of FIG. 1.

As has been indicated above, the apparatus of the present invention will be here illustrated as part of an otherwise conventional palletizer. In such a palletizer empty pallets A, stored in a pallet dispenser B, are deposited onto an empty pallet conveyor C which moves a pallet A onto a hoist conveyor D associated with a hoist E which lifts the empty pallet to an upper level which defines the loading station F of the apparatus. The empty pallet A, when it is on the hoist conveyor D, extends beyond that conveyor, and the hoist E engages the empty pallet at a plurality of positions surrounding the hoist conveyor D, thereby to lift the pallet to the loading station F. After a series of loading operations, hereinafter to be described, in which a series of layers of containers are stacked on the pallet A, the hoist E lowers the pallet A with the stacked containers thereon until the pallet A is once again deposited on the hoist conveyor D. The hoist conveyor D then conveys the pallet A with the stack of containers thereon onto a full pallet conveyor G, where the loaded pallet is conveyed to an unloading station H for subsequent treatment. These aspects of the palletizer may take many different known forms, are well known in the art, and hence are not here described in detail.

The novel apparatus of the present invention is operative at the loading station F. There a framework 2 surrounds the open space 4 into which a pallet A is adapted to be raised by the hoist E so that the upper surface of the pallet A (or of a separator sheet 6 placed thereon from sheet supply 18) is substantially in line with the upper surface of the framework 2. Adjacent the loading station F, and at the same level as the framework 2, is a container row-forming station generally designated I designed to receive rows of containers 8 fed to it by some suitable container feeding apparatus generally designated J capable of feeding the containers in one or more rows. Many such feeding mechanisms are known to the art, they form no part of the present invention, and hence they will not be here disclosed in detail. Means generally designated 12 are provided for maintaining the containers in a row at the row-forming station I and other means generally designated 14 are provided to fix the position of the leading containers in a given row. As here disclosed, the apparatus forms two rows of containers at the row-forming station, the means 12 defining the spaces for receiving those two rows and the feeding means J being capable of feeding the containers into those two rows in any appropriate and known manner. After the desired number of rows of containers have been formed at the row-forming station I they are then pushed onto the pallet A (or the sheet 6 thereon if present) at the loading station F by means of a ram 16, the ram being active on the second row of containers to force that row against the first row and then force the two rows together onto the most adjacent portion of the pallet A. Ram 16 then retracts, two new rows of containers are formed at the row-forming station I, the ram 16 pushes those two rows onto the most adjacent portion of the pallet A, this of necessity moving the first-pushed rows farther onto the pallet A, and that sequence of operations continues until the desired number of rows of containers have been pushed onto the pallet A. The hoist E is then actuated to lower the pallet A and the thus produced first layer of containers thereon, a new separator sheet 6 is fed from sheet supply 18 onto the top of that first layer of containers, and the hoist positions itself in such a way that the upper level of that separator sheet 6 is substantially at the same level as the upper surface of the framework 2. The above-described sequence is then repeated until the desired number of rows of containers have been placed on that sheet 6, the hoist E then lowers the assembly for reception of another sheet 6 and its location at the proper level, and so on until the desired number of layers of containers have been placed on the pallet A. Then a separator sheet 6 is placed on the top layer, a top frame 8 from a top frame supply 20 is positioned on top of that and the hoist E lowers the assembly until the pallet A with the layers of containers thereon is deposited on the hoist conveyor E, after which, as has been described, the loaded pallet is moved to the unloading station H.

Figure 3:
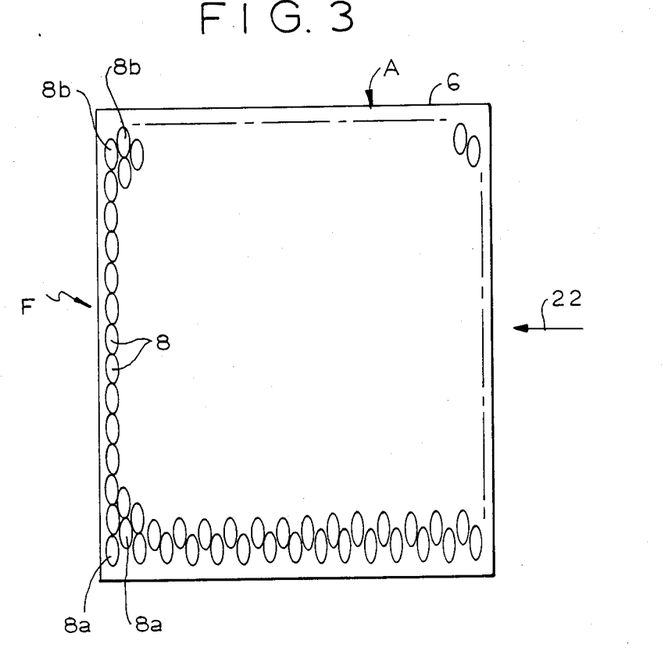
FIG. 3 is a top plan schematic view of a loading station of the machine in the present invention showing one way in which a group of containers having narrow elongated cross-sections may be arranged.

FIG. 3 illustrates a typical arrangement of containers on a pallet A or a sheet 6 to form a single container layer. As illustrated, the containers are of flask-like cross-section, narrow and elongated. There are fourteen of them in each row, and the rows are staggered, so that the end container 8a in the first row extends beyond the end container 8a in the second row, while the end container 8b at the other end of the second row extends beyond the end container 8b of the first row, and so on. The individual rows are fed onto the pallet A or sheet 6 from right to left as viewed in FIG. 3, as indicated by the arrow 22.

Figure 5:
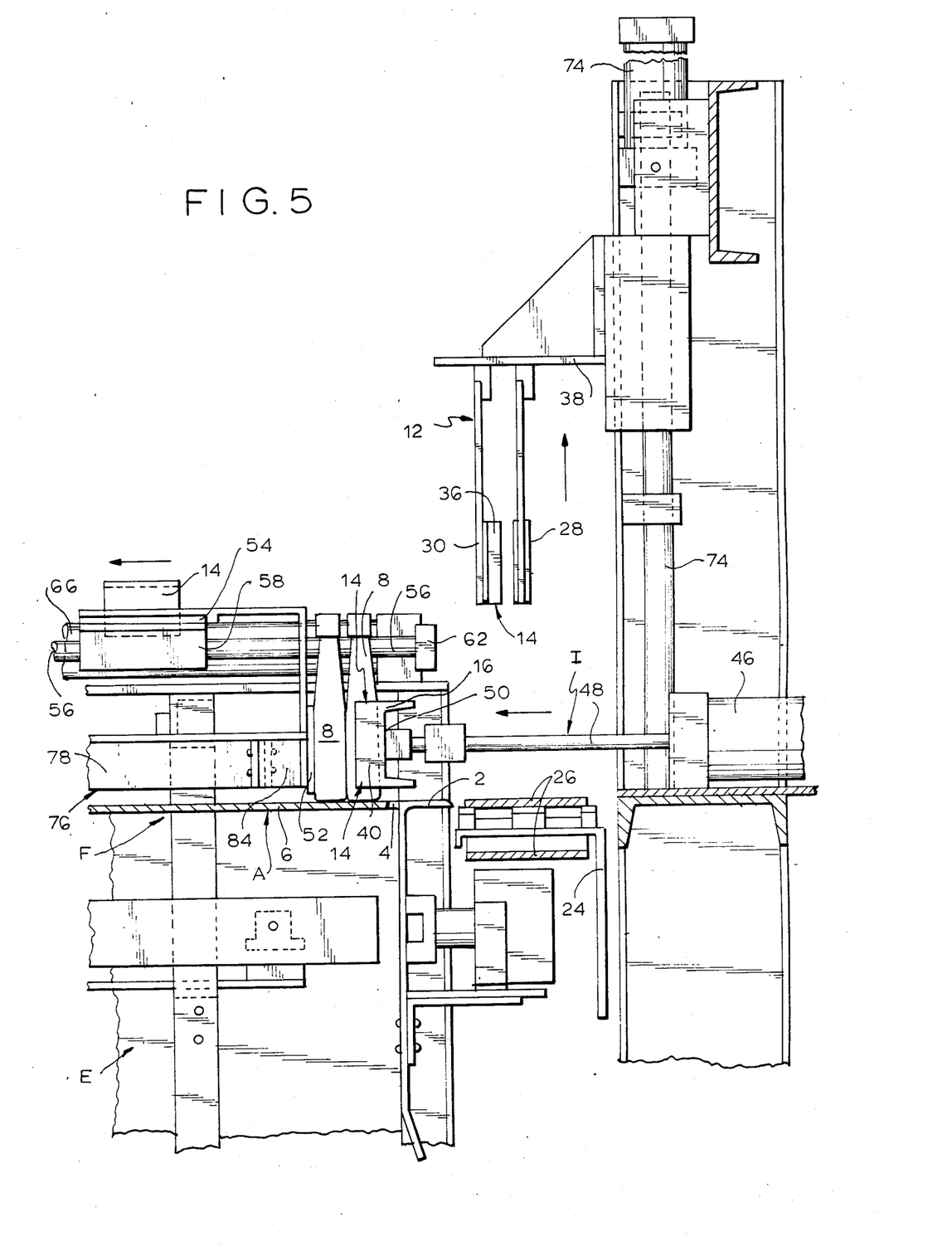
FIG. 5 is a side elevational view on an enlarged scale of the right-hand portion of FIG. 4 but showing the parts in the position which they assume after the two rows of containers shown in FIG. 4 have been moved from the row-forming station onto the loading station.
Figure 8A:
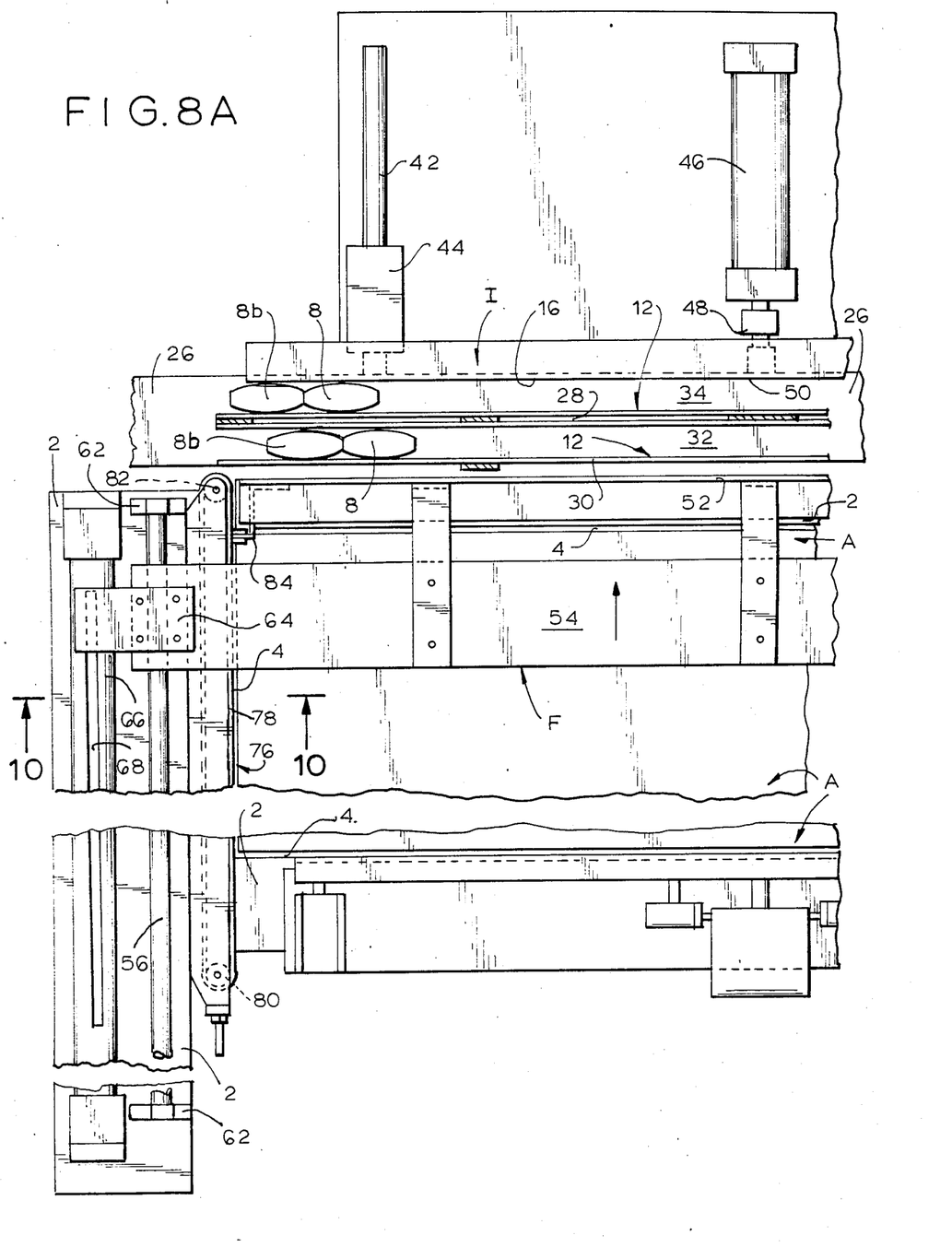
FIGS. 8A and B are top plan views of the apparatus of FIG. 6.
Figure 8B:
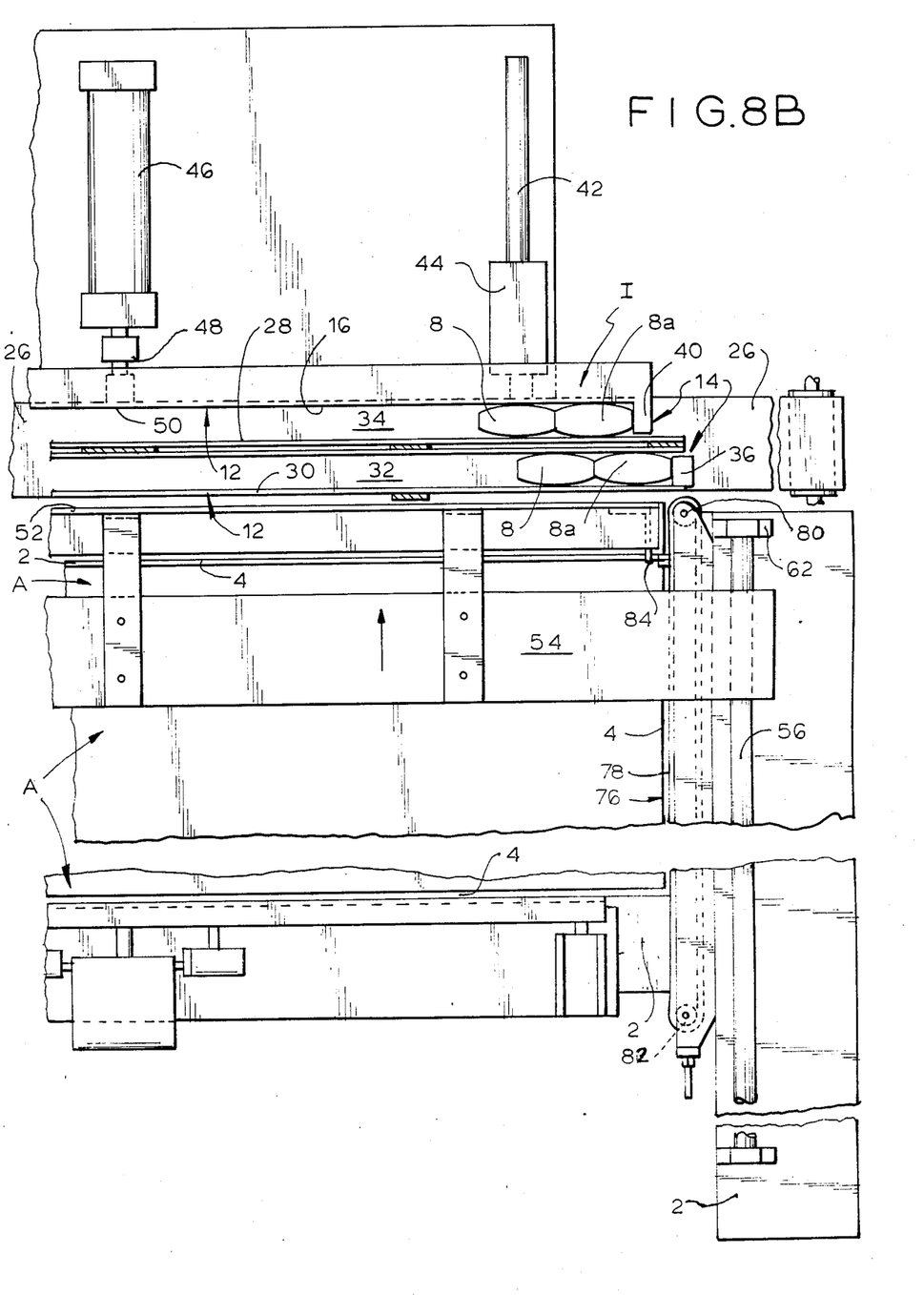
Figure 9:
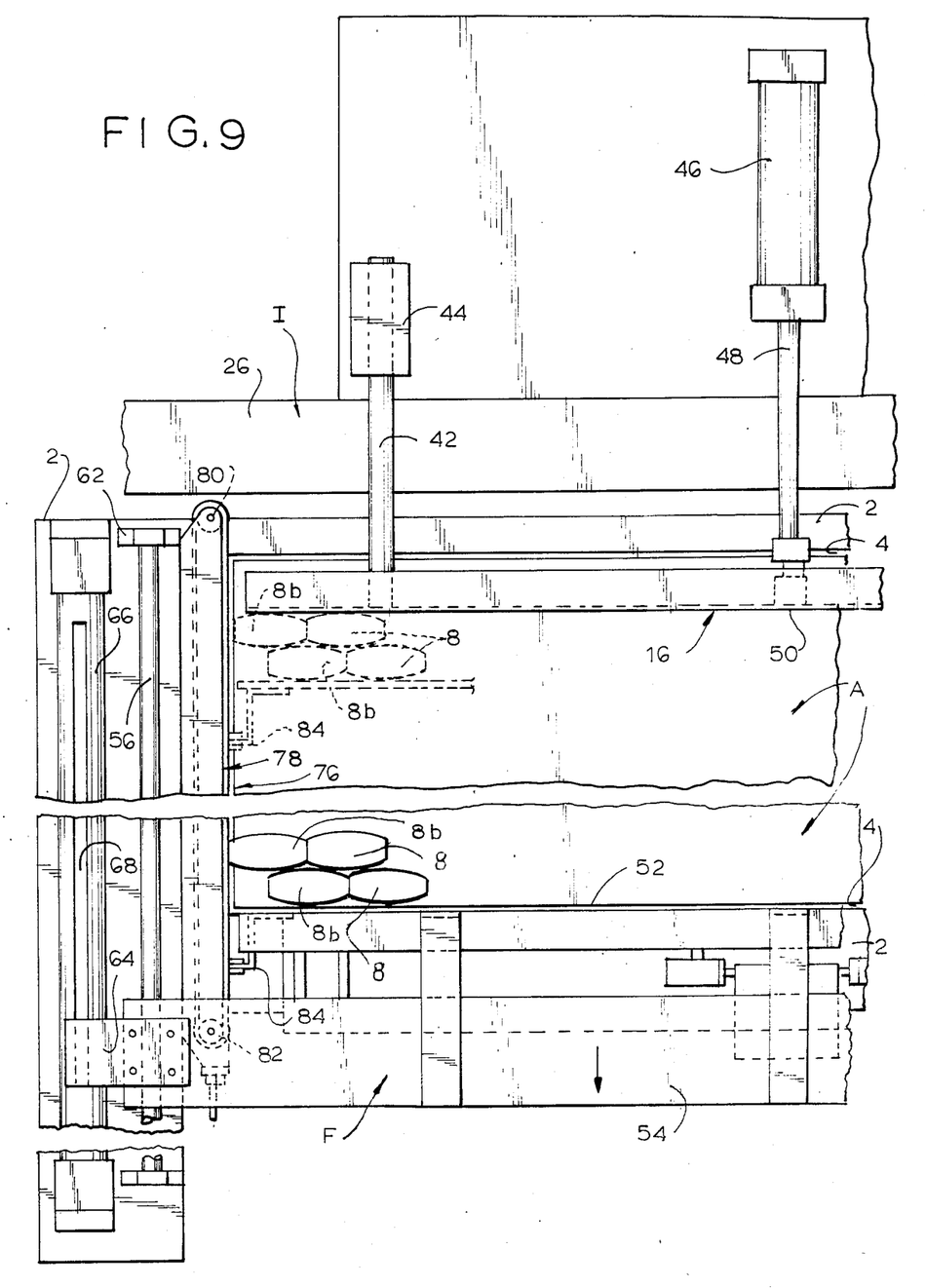
FIG. 9 is a view similar to FIG. 8A but with the lane guides raised and the ram forward, the position of the first two rows of containers when they are first moved onto the loading station being shown in broken lines and the position of those first two rows after a number of other rows have been moved onto the loading station being shown in solid lines.

The row-forming station I comprises a support generally designated 24 on which a conveyor 26 is mounted, that conveyor preferably comprising one or more endless belts designed to have their upper reaches driven from left to right as viewed in FIG. 8, the containers 8 being conveyed by the feeding means J onto the left-hand of the conveyor 26, the containers then being conveyed from left to right thereby. As has been indicated, in the apparatus specifically disclosed two rows of containers are formed at the row-forming station I. Only a single conveyor belt 26 is shown for conveying both rows, but if desired individual conveyors 26 could be used for each row. The positioning of the containers 8 in rows is ensured by means of row guides 28 and 30 and ram 16, all of which extend the full width of the row-forming station I, thereby to define a space 32 between the row guides 30 and 28 for a first row of containers and a space 34 between the row guide 28 and the ram 16 for a second row of containers. As the containers are fed from left to right by the conveyor 26, the leading container 8a in each row comes up against a stop which positions that row. The stop for the first row of containers, formed in the space 32, is defined by a member 36 carried by the row-forming guide 30, the guides 28 and 30 depending from a support 38. The stop for the second row of containers is defined by a forward projection 40 extending from the right-hand end of the ram 16. The ram 16 is mounted for movement between an initial position shown in FIGS. 8A and 8B, in which the space 34 is defined between itself and the row guide 28, and a feeding position shown in FIGS. 5 and 9, in which it is moved beyond the row-forming station I over the right-hand portion of the pallet A or sheet 6. Its mounting for that movement is produced by rods 42 slidable in bearings 44 mounted on the fixed structure of the apparatus, and the motive force for moving the ram 16 between its operative positions is produced by a power cylinder 46 also mounted on the fixed structure of the apparatus and active on a piston rod 48 which extends therefrom and which is secured to the ram 16 at 50.

Figure 10:
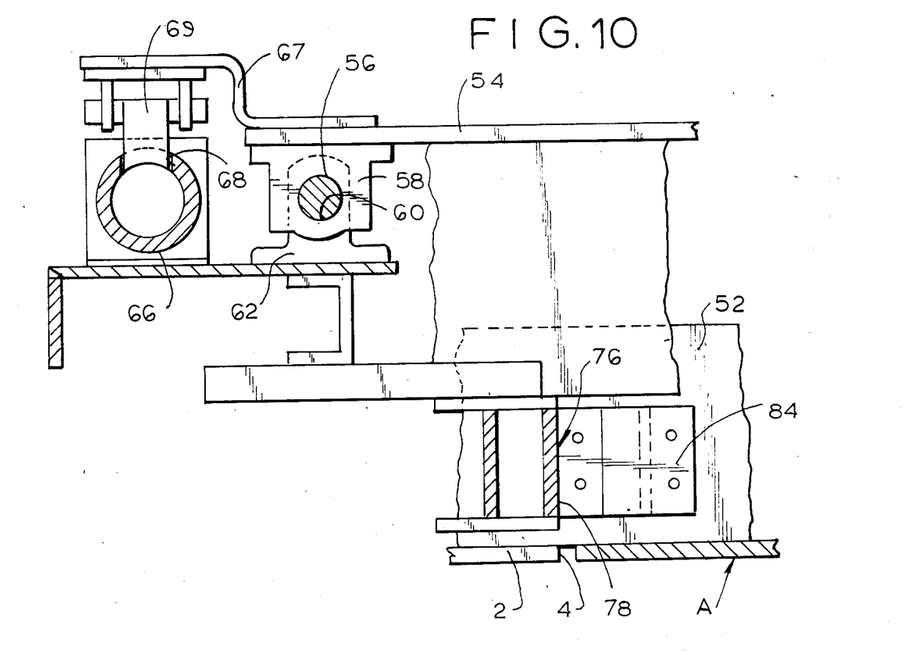
FIG. 10 is an enlarged cross-sectional view taken along the line 10—10 of FIG. 8A.

It will be noted from FIG. 3 that the flask-shaped bottles here disclosed are moved onto the loading station I in the direction of their narrow width. Those containers are particularly subject to dislocation, and particularly to tipping over, when moved in that direction, because of the narrowness of their width in the direction in which they are moved, a tendency which is aggravated if, as is usually the case, the bottles are tall and further aggravated, as is often the case, if the bottles bulge out as they rise from a narrow bottom. To overcome this tendency a retaining wall 52 is mounted at the loading station F so as to extend across the loading area at a height such as to be engaged by the containers of the leading row as they are moved onto the loading station F. The retaining wall 52 is designed to move from a position close to the row-forming station I to a position remote therefrom as the loading station F becomes filled with rows of containers, and to that end it is connected to framework 54 which is slidingly mounted at its opposite ends on rods 56 on either side of the loading station F and extending the length thereof, that mounting, as here shown, being in the form of brackets 58 depending from the framework 54 and having apertures 60 sliding over the rods 56, the rods in turn being fixedly mounted on brackets 62 attached to the fixed framework of the apparatus (see FIG. 10).

The retaining wall 52 is so designed as to resist movement from its position close to the row-forming station I to its position remote therefrom, but not to prevent such motion, and to resist that motion to a substantially uniform degree throughout its range of motion. To that end a lateral projection 64 from the framework 54 extends over a rodless pneumatic cylinder 66 mounted on the apparatus just outside the left-hand rod 56, that rodless cylinder 66 having an internal piston to which access is achieved through a slot 68 on the upper surface of the cylinder, connection between that piston and the lateral projection 64 being accomplished by means of the structure 69 best seen in FIG. 10. During movement of the retaining wall 52 from its initial position close to the row-forming station I to its final operative position remote therefrom, all pneumatic operative connection to the cylinder 66 may be made inoperative, in which case the internal piston thereof will resist movement primarily if not exclusively by reason of frictional effects. These effects have been found to be entirely adequate for the purposes here involved.

Figure 4:
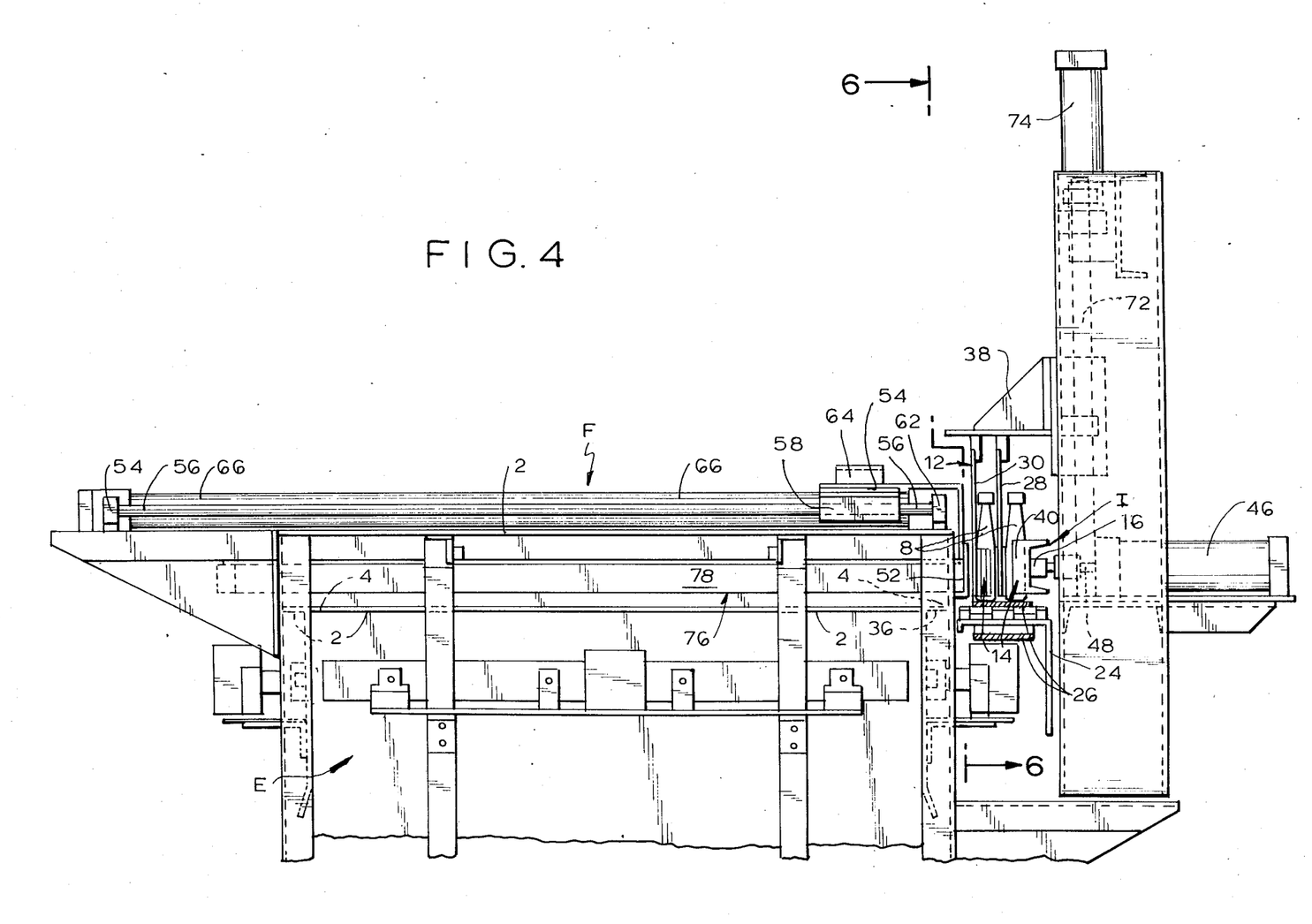
FIG. 4 is a side elevational view of the loading section of the palletizer showing two rows of containers at the row-forming station before any containers are moved onto the loading station.
Figure 6:
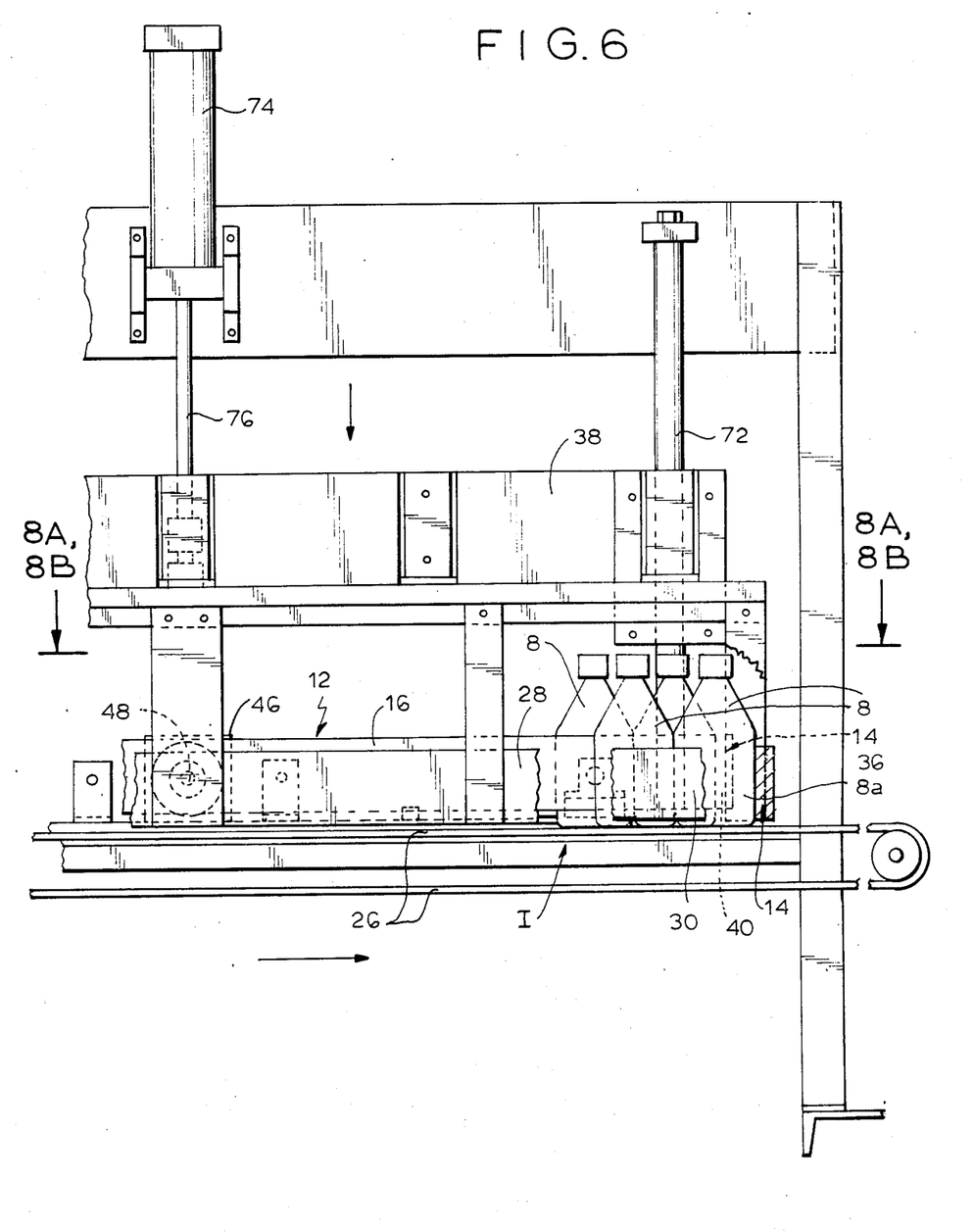
FIG. 6 is an elevational view of the apparatus of FIG. 4 taken along the line 6—6 thereof.
Figure 7:
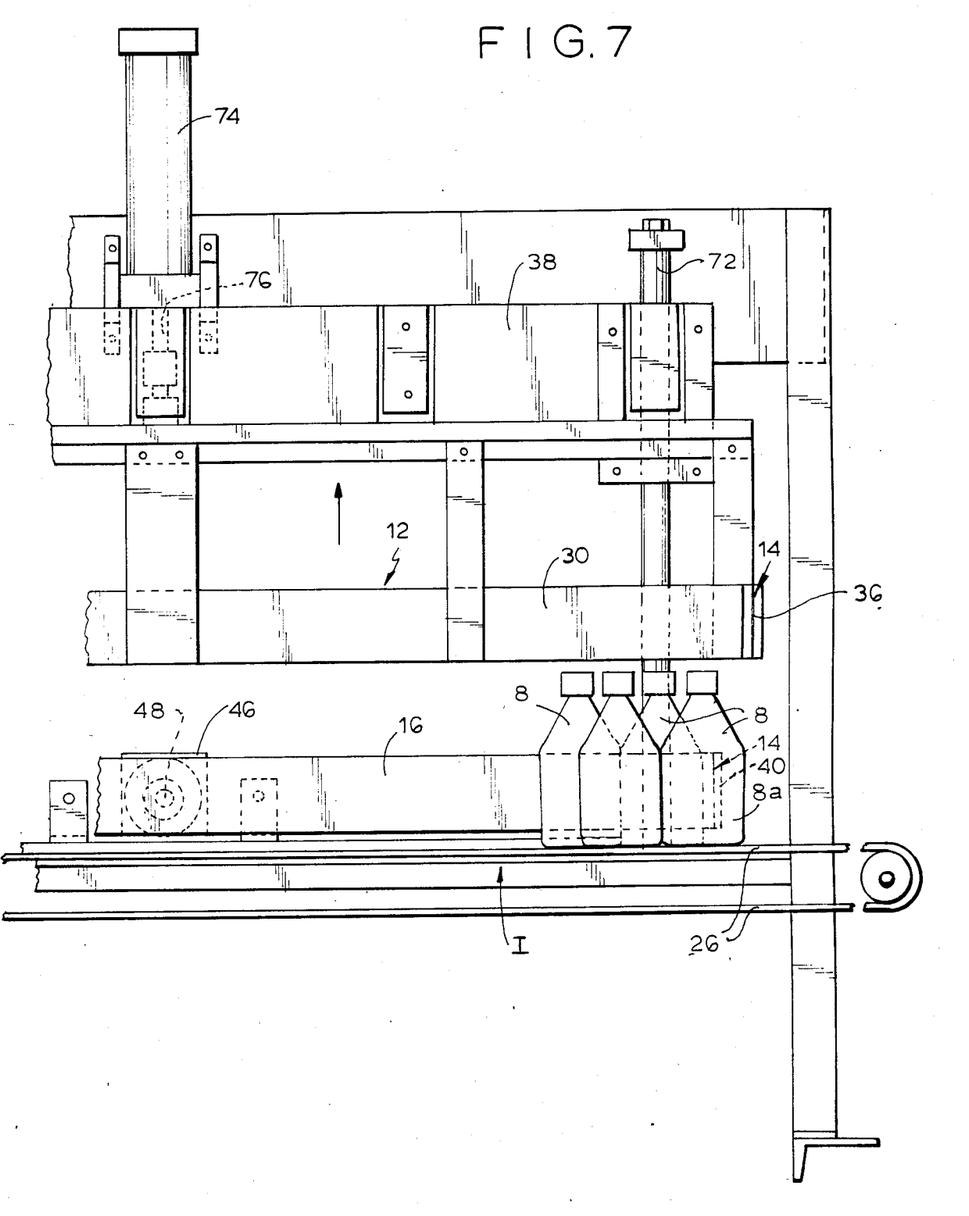
FIG. 7 is a view similar to FIG. 6 but showing the lane guides lifted just before the containers are pushed from the row-forming station.

The support 38 from which the row guides 28 and 30 depend is mounted on the apparatus for vertical movement, as by being slidable on vertically extending rods 72, and a pressure cylinder 74 has its piston rod 76 connected to the support 38 so as to move that support between lower and upper operative positions. In the lower operative position of the support 38, as shown in FIGS. 4, 6 and 8, the row guides 28 and 30 are located just above the conveyor 26, thereby to form the spaces 32 and 34 into which the two rows of containers are fed. In its upper operative position, shown in FIG. 5, the row guides 28 and 30 are lifted to a position above the tops of the containers in the row spaces 32 and 34. After the two container rows have been formed, the cylinder 74 is actuated to lift the row guides 28 and 30 to their upper operative position, in which they are out of the way, and then the cylinder 46 is actuated to move the ram 16 from its initial position shown in FIGS. 4 and 8 to its final position shown in FIGS. 5 and 9. As the ram 16 is thus moved it first engages the row of containers 8 in space 34 and moves them into engagement with the row of containers formed in space 32. It then pushes both rows of containers up against the retaining wall 52, which is initially in its position shown in FIG. 8, and then moves both rows of containers and the retainer wall 52, as a unit, to the position shown in broken lines in FIG. 9. Because the retainer wall 52 frictionally resists that movement, a substantially solid mass of containers is formed on the pallet A. During the next row-forming and feeding sequence two more rows will be pushed onto the pallet A by the ram 16, and they in turn will push the first two rows further onto the pallet A, moving the retainer wall 52 further back, again producing a substantially solid mass of containers. This will continue until the pallet A has been filled, as shown, for example, in FIG. 3. As a result of this sequence of operations the mass of containers on the pallet A are reliably held against dislocation or falling.

After a given pallet A (or sheet 6) has been loaded and the hoist E lowers the assembly for reception of the next layer of containers, the rodless cylinder 66 is pressure actuated to move the retainer wall 52, then at the far end of the loading station F, back to its initial position close to the row-forming station I, after which pressure is reduced or cut off, enabling the cylinder 66 to uniformly restrict movement of the retaining wall 52 as described above.

The retaining wall 52 performs very well in ensuring reliability of movement and positioning of the containers within the mass and at the front and rear ends of the mass, but it does not perform as well with respect to the containers at the ends of the rows, particularly where those rows are staggered with respect to one another. As can be seen from FIG. 3, one end container of each row projects out beyond the adjacent rows, and those projecting containers, as the rows are sequentially pushed across the loading station F, are very liable to be moved out of position and to fall over. This is particularly the case when, as is generally necessary, side walls must be provided at the loading station F to laterally confine the containers at the loading station F. Without such side walls the feeding pressure on the container rows would tend to force end containers in rows out laterally from their proper position. In order to eliminate this very serious impediment to the use of apparatus of this type, particularly in connection with unstable containers such as are here disclosed, the apparatus of the present invention provides side walls generally designated 76 which supportingly engage containers at the ends of container rows and move with those containers and their rows as the loading station F becomes filled with containers. More specifically, at each side of the loading station F, and extending along its entire length toward and away from the row-forming station I, and so laterally located as to be engaged by the tips of the end containers 8a of the odd-numbered rows and the end containers 8b of the even-numbered rows respectively when the containers are staggered as shown in FIG. 3, are belts 78 extending over rollers 80 and 82, the belts being positively fixed, by brackets 84, to the retaining wall 52. Thus as the retaining wall 52 is moved, as it will be when the ram 16 forces rows of containers onto loading station F, the belts 78 defining the side walls on each side of the loading station F will move simultaneously therewith. As a result, as may perhaps best be seen from FIG. 9, when the first two rows of containers are moved onto the pallet A by the ram 16, the end container 8b of the second row will engage the belt 78 at the left-hand side of the loading station F (and, it will be understood, the end container 8a of the first row will correspondingly engage the belt 78 at the other side of the loading station F). As subsequent rows of containers 8 are moved into place on the loading station F, and therefore as the end containers 8a and 8b of the first and second rows respectively are moved further onto the pallet A, the side walls 78 that they engage will move with them, and hence there will be no tendency for the bottles to turn, twist or topple. This effect will be repeated, as will be understood, for all subsequent rows of containers 8 as they are moved into position.

By this arrangement even highly unstable bottles may be loaded and palletized at speeds comparable to those commercially achieved for conventional and more stable containers, and without having to deal with the consequences of container dislocations or topplings. The containers in the bulk of the layer are reliably maintained in self-supporting engagement during and after the loading operation, and the end containers of the rows are so supported that there is no tendency for them to fall or be shifted in position.

While the present invention has been described in conjunction with a palletizer, in which a series of layers of containers are formed and assembled, it will be apparent that the invention is not limited thereto, but is more generally applicable to any apparatus in which one or more layers of containers are to be formed. Moreover, it will be apparent that many variations may be made in the specific structural elements here disclosed and in their manner of actuation, all without departing from the spirit of the invention as defined in the following claims.

I claim:

1. In a machine for loading a group of upright containers in rows onto a loading platform comprising a loading platform stationary while upright containers are being loaded thereon and a container row-forming station adjacent and substantially parallel to one another at substantially the same level, and moving means to move rows of vertically oriented upright containers aligned along said row-forming station from said row-forming station and sliding them onto and across said loading platform, the improvement which comprises a retaining wall at said loading platform mounted in the path of said container rows for movement relative to said stationary platform from an initial position near said row-forming station to a subsequent position remote from said row-forming station, said wall being oriented substantially parallel to said rows so as to be engageable by the leading one of said rows, means operatively connected to said wall for resisting movement thereof from its initial to its subsequent position, and actuatable means operatively connected to said wall to return it to its initial position from its subsequent position, and side walls at said loading platform between which said rows of upright containers are supportingly received with upright containers at the ends of said rows engaging said side walls, said side walls being movable in the direction of movement of said rows of containers onto said loading platform, and means for moving said side walls in said direction substantially in synchronism with said movement of said retaining wall, whereby said side walls support said containers in upright condition without exerting any forces on them tending to disturb their upright condition.

2. The machine of claim 1, in which said side walls comprise belts extending substantially the length of said loading platform and bent around supports located adjacent the leading and trailing ends of said loading platform, said belts moving over said supports as said belts are moved substantially in synchronism with said movement of said rows of containers.

3. In a machine for loading a group of containers in rows with the containers of adjacent rows staggered relative to one another, comprising a loading station and a container row-forming station adjacent one another and moving means to move formed rows of containers from said row-forming station onto said loading station, the improvement which comprises means for feeding said containers onto said row-forming station in two adjacent rows of containers, stop means at said row-forming station for each container row to be engaged respectively by the leading container of each row, said stop means being so located as to form said rows with the containers in adjacent rows staggered with respect to one another, one of said stop means being carried by and movable with said moving means.

4. The machine of claim 3, in which the first and second of said rows are relatively adjacent to and spaced from said loading station respectively, said stop means carried by said moving means being operative on said second row and located substantially in line with the center of the leading container in said first row.

5. The machine of claim 3, in which first and second of said rows are relatively adjacent to and spaced from said loading station respectively, said stop means for said first row being located farther from said feeding means than said stop means for said second row.

6. The machine of claim 5, in which it is said stop means for said second row which is carried by said moving means.

7. In a machine for loading a group of containers in rows comprising a loading station and a container row-forming station adjacent one another and moving means to move rows of containers from said row-forming station onto said loading station, the improvement which comprises a retaining wall at said loading station mounted in the path of said container rows for movement from an initial position near said row-forming station to a subsequent position remote from said row-forming station, said wall being oriented substantially parallel to said rows so as to be engageable by the leading one of said rows, means active on said wall for substantially uniformly resisting movement thereof from its initial to its subsequent position, and means active on said wall to return it to its initial position from its subsequent position, said loading station comprising a supporting structure onto which said rows of containers are moved, said movement-resisting means comprising a fluid pressure piston-cylinder combination mounted adjacent said supporting structure, said retaining wall being mounted above said supporting structure and movable thereover and being operatively connected to the piston of said combination, belts mounted at the sides of said supporting structure to constitute side walls between which said rows of containers are supportingly received, said belts being movable in the direction of movement of said rows of containers onto said loading station, and means for operatively connecting said belts and said retaining wall for movement together.

* * * * *